United States Patent [19]
Staats et al.

[11] 3,807,087
[45] Apr. 30, 1974

[54] AUTOMATIC BATTERY CUT-OFF SYSTEM FOR ELECTRIC MOTOR-DRIVEN TOY VEHICLES USING RECHARGEABLE BATTERIES

[75] Inventors: William A. Staats, Torrance; Toshio Yamasaki, Gardena, both of Calif.

[73] Assignee: Mattel, Inc., Hawthorne, Calif.

[22] Filed: Oct. 10, 1972

[21] Appl. No.: 296,460

[52] U.S. Cl......... 46/243 M, 46/243 AV, 46/244 B, 46/78, 200/153 LA, 200/153 T, 318/346
[51] Int. Cl...................... A63h 29/22, A63h 30/04
[58] Field of Search.... 46/243 M, 243 LV, 243 AV, 46/243 MV, 243 P, 243 E, 244 R, 244 A, 244 B, 244 D

[56] References Cited
UNITED STATES PATENTS
3,377,742  4/1968  Sheldon et al. ................. 46/243 M
3,386,406  6/1968  Tsunoda...................... 46/243 M X
3,745,699  7/1973  Mabuchi...................... 46/243 AV FOREIGN PATENTS OR APPLICATIONS
1,142,782  1/1963  Germany...................... 46/243 MV Primary Examiner—F. Barry Shay
Attorney, Agent, or Firm—Franklin D. Jankosky; Max E. Shirk

[57] ABSTRACT

A system for automatically cutting off a rechargeable battery power supply carried by an electric motor-driven toy vehicle when the level of charge of the battery is reduced to a predetermined minimum safe level, the system including a mechanical sensing arrangement coupled to the toy's drive mechanism which arrangement is displaced by and thereby sensitive to the rotational power of the electric motor that is transmitted to the vehicle's propulsion arrangement, the system also including a mechanically actuated electric switch that is electrically connected serially between the battery and the electric motor and that is mechanically coupled to the sensing arrangement to electrically cut off the battery when the displacement of the sensing arrangement reaches a predetermined minimum amount. The mechanically actuated switch is on a plate pivotally mounted by means of a toggle arrangement having two biased and manually selectable stable conditions. The toy may include a radio receiver for remote control of the vehicle, the receiver being on a separate circuit independent of the motor circuit.

10 Claims, 6 Drawing Figures

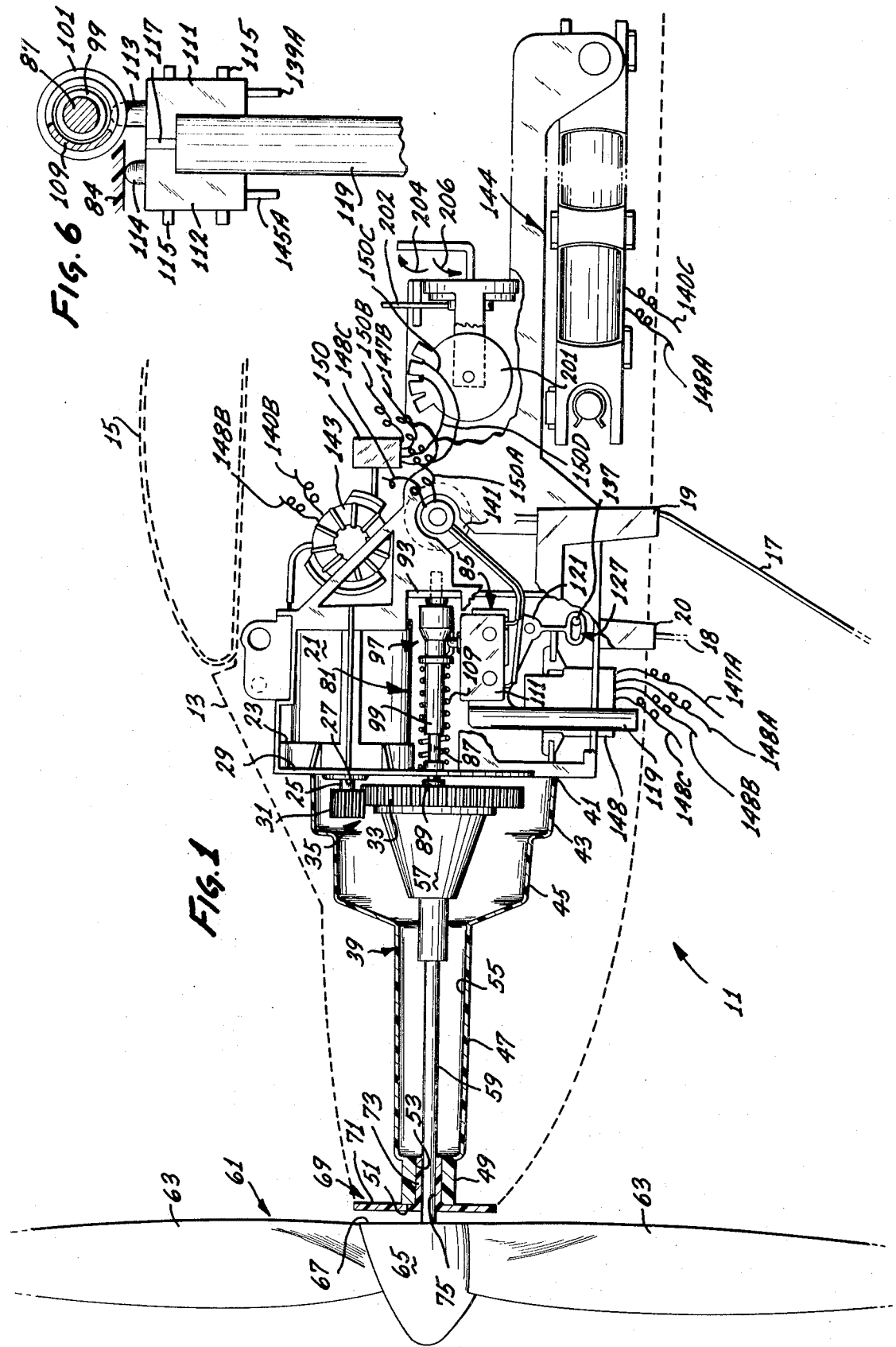

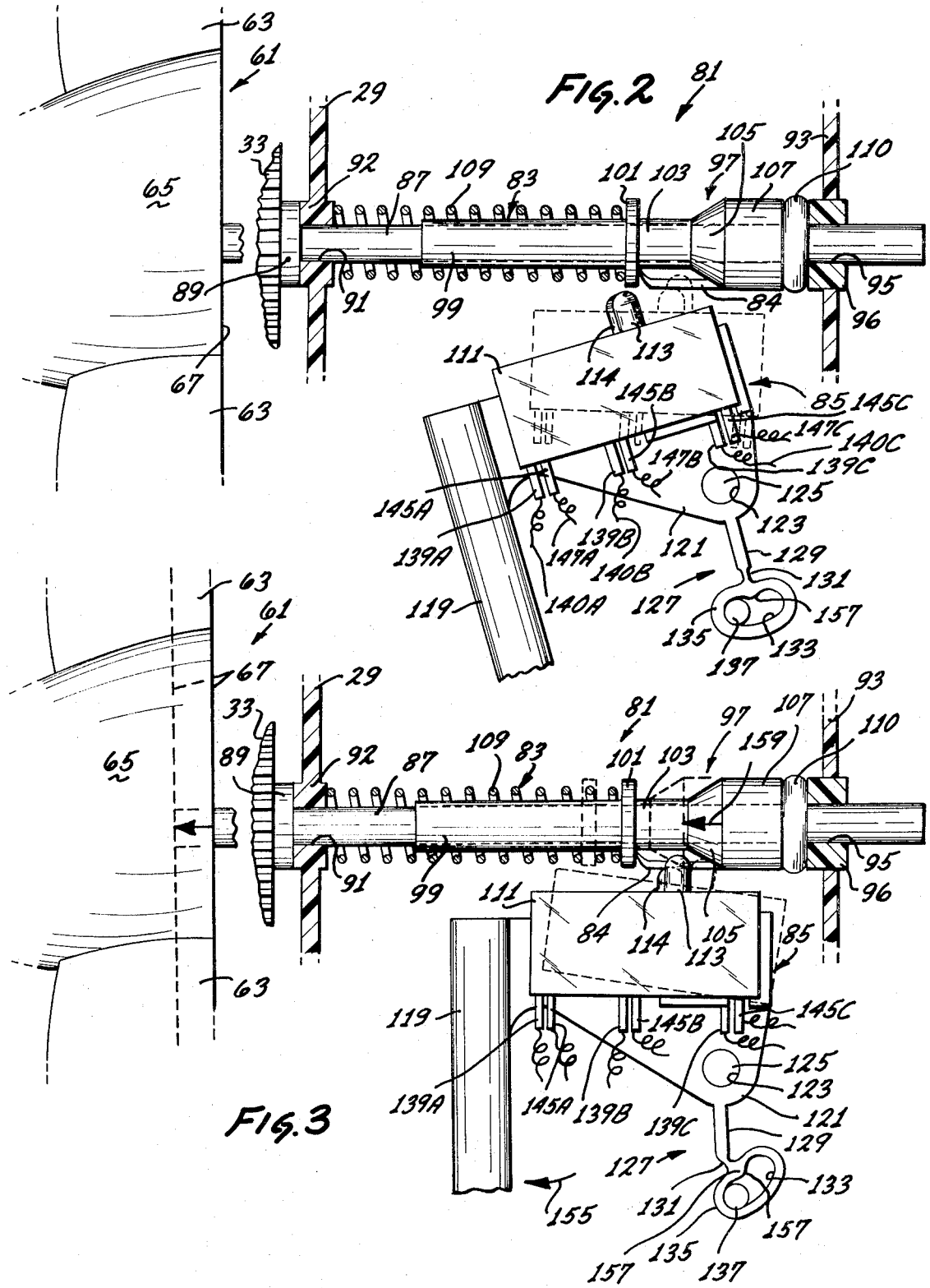

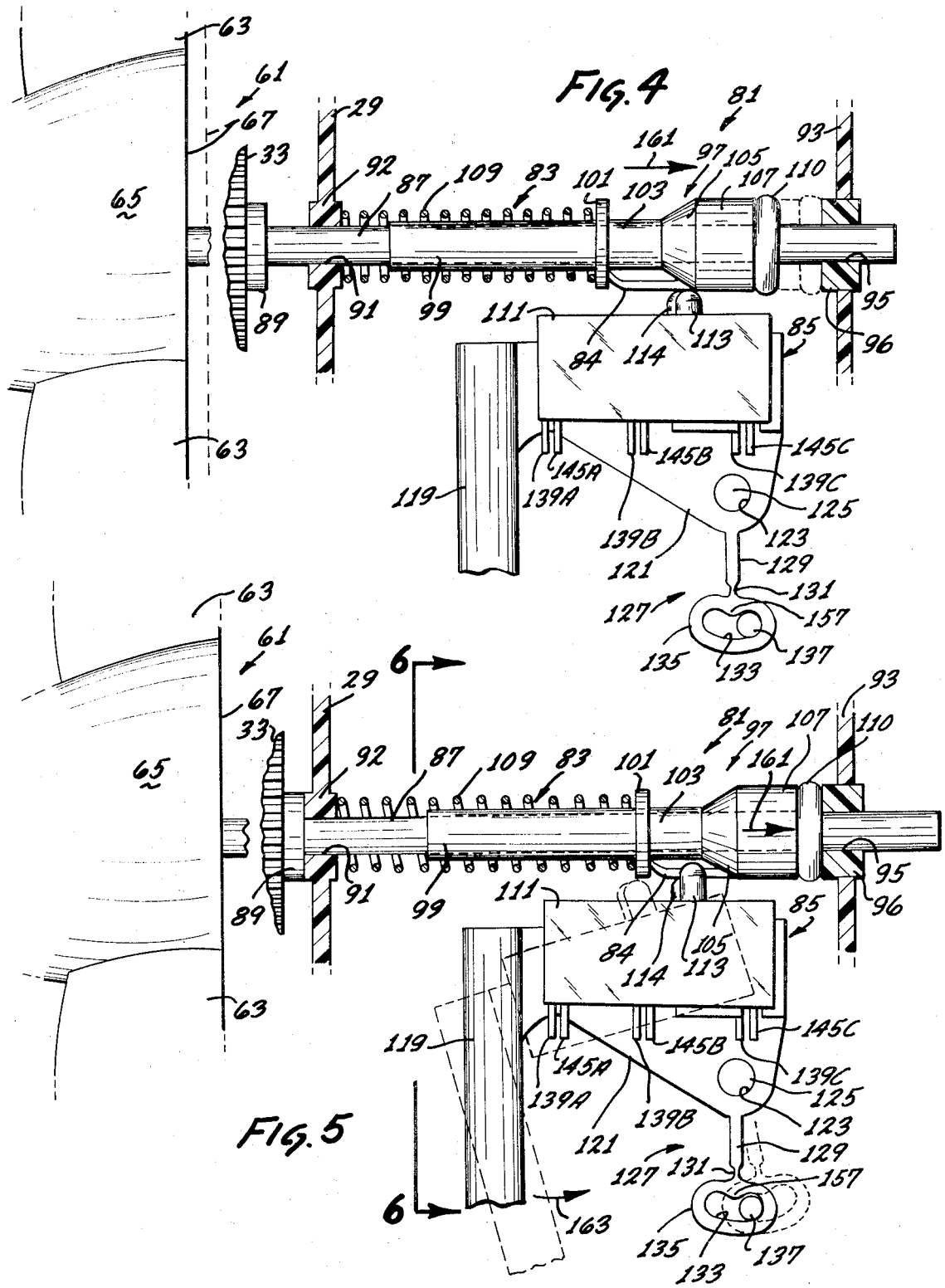

3,807,087

AUTOMATIC BATTERY CUT-OFF SYSTEM FOR ELECTRIC MOTOR-DRIVEN TOY VEHICLES USING RECHARGEABLE BATTERIES

BACKGROUND OF THE INVENTION

The background of the invention will be set forth in two parts.

Field of the Invention

The present invention pertains generally to the field of toy vehicles and the like, and more particularly to electric motor-driven toy vehicles having self-contained rechargeable batteries.

Description of the Prior Art

Toy vehicles driven by internally mounted electric motors are well-known. In most instances in the past, the batteries used for powering the motors were of the dry cell type, which must be replaced, usually after only a relatively short period of time. The electric motors used were generally large, heavy and inefficient. The weight of these batteries and motors added to the load of the system. This failing coupled with the short longevity of the batteries essentially precluded their use in flyable toy aircrafts, for example.

In more recent times, there has been developed relatively smaller, lighter, more powerful and more efficient electric motors. Along with this development, relatively lighter and higher-capacity rechargeable batteries have become commercially available for powering the new miniature motors. It has been a normal consequence in the advancement of toy technology to incorporate these newly developed structures in more advanced toys. However, it has been found that the rechargeable batteries, usually nickel-cadmium cells, are easily permanently damaged by allowing these batteries to be discharged, under an operating load, to below a safe minimum level.

In most cases, it has been found to be commercially unfeasible to include a usually costly electronic battery level sensing circuit in a toy utilizing these batteries, and as a consequence, the toy's useful life is relatively much shorter than it would be if an automatic system cutting off the battery were incorporated in the toy.

SUMMARY OF THE INVENTION

In view of the foregoing factors and conditions characteristic of the prior art, it is a primary object of the present invention to provide a new and useful battery cut off system for electric motor-driven toy vehicles.

Another object of the present invention is to provide a simple, yet reliable automatic battery cut off system which senses the charge level of the battery by monitoring the effect of rotational power transmitted from the toy's electric motor to its propulsion arrangement.

Still another object of the present invention is to provide a battery cut off system for use in battery-powered, electric motor-driven toy vehicles such as toy propelled aircraft and the like.

Yet another object of the present invention is to provide a battery cut off system for toy vehicles that incorporates a radio-control receiver switching arrangement along with means for automatically disconnecting the toy's electric motor battery arrangement when the charge level thereof has reached a predetermined minimum safe level.

A further object of the present invention is to provide a battery cut off system for electric motor-driven toy vehicles that allows an operator to first test the toy's radio before the electric motor is activated, and then allows the radio to remain functioning after the motor's battery is cut off when it has discharged to a predetermined minimum safe level.

According to an embodiment of the present invention, an automatic battery cut off system is provided for disconnecting a rechargeable battery of an electric motor-driven toy vehicle from its load when it is discharged to a predetermined level. The cut off system includes drive means operatively coupling the vehicle's motor to its propulsion arrangement for transmitting the motor's rotational power to the propulsion arrangement. The invention also includes switch means having an actuation arrangement operatively mechanically coupled to the drive means for sensing the amount of rotational power transmitted to the propulsion arrangement. The switch means is also electrically connected serially between the motor and the battery for maintaining energization of the motor only as long as the amount of rotational power transmitted to the propulsion arrangement remains above a predetermined level.

The switch means may include a spring-biased cam member connected to the toy's gearing drive mechanism, and may also include a micro switch actuated by a displacement against the spring bias of the cam member and the drive mechanism caused by a predetermined amount of working rotational power being transmitted to the toy's propulsion arrangement, the cam member being moved in the opposite direction by the spring bias and deactivating the micro switch when the transmitted power falls below the predetermined amount.

The features of the present invention which are believed to be novel are set forth with particularity in the appended claims. The present invention, both as to its organization and manner of operation, together with further objects and advantages thereof, may best be understood by making reference to the following description, taken in conjunction with the accompanying drawings in which like reference characters refer to like components in the several views.

BRIEF DESCRIPTION OF THE DRAWINGS

FIG. 1 is a side elevation of a toy aircraft, partially broken away, showing the internally-mounted power plant and the rechargeable battery along with the battery cut off system in accordance with the present invention;

FIGS. 2-5 are schematic illustrations of the switch system of FIG. 1 shown in its various functional positions; and FIG. 6 is an elevational view taken along line 6—6 of FIG. 5.

DESCRIPTION OF THE INVENTION

Referring now to the drawings and more particularly to FIG. 1, there is shown a portion of a radio-controlled toy airplane 11 having a fuselage depicted generally by a dashed outline 13, wing 15, and a pair of landing gear struts 17, 18, the uppermost portions of which are anchored in a pair of reinforced fuselage structures 19 and 20, respectively. The fuselage 13 also houses a relatively light-weight but powerful miniature electric motor 21. The motor 21 is held in a molded plastic structure 23 such that its output shaft 25 extends forward through an appropriate opening 27 in a bulkhead 29. The shaft 25 carries a pinion 31 that is meshed with a drive gear 33.

The pinion 31 and the drive gear 33 are part of a drive gear train, generally designated 35, that resides within a nose cone structure 39. The peripheral edge 41 of the nose cone 39 is attachable by any conventional means to the bulkhead 29, and has different diameter sections 43, 45, 47 and 49. The last section 49 includes a forward end 51 with an axial bore 53 therethrough which communicates with the interior 55 of the structure 39.

The drive gear train 35 is mechanically coupled through a resilient coupling member 57 attached to the gear 33 and through a propeller shaft 59 to a plastic or wooden propeller 61. The propeller includes a pair of blades 63 having a predetermined fixed pitch and a centrally-located hub portion 65. Between the forward end 51 of the nose cone 39 and a rear face 67 of the hub portion 65 is a bearing element 69 having a transverse disc portion 71 and a tubular axial portion 73 through which is disposed a bore 75 dimensioned to rotatably support the propeller shaft 59.

Referring now to FIGS. 1, 2 and 6, the invention also utilizes a switch arrangement 81, the arrangement having a displacement portion 83, a fixed camming plate 84 and a switch portion generally designated by reference 85. The displacement portion 83 includes an elongated shaft 87 axially aligned with the propeller shaft 59 and positioned behind the drive gear 33. The forward end of the shaft 87 frictionally engages and is affixed to a hub spacer portion 89 of the gear 33 and extends through an appropriate opening 91 formed in a combined bearing-spacer 92 formed integrally with the bulkhead 29. The rearward end of the shaft 87 extends beyond a structural wall 93, through a hole 95 provided in a combined bearing-spacer 96 formed integrally with wall 93. A cam element 97 is affixed to the shaft 87 and has an elongated tubular portion 99, a spring retaining ring portion 101, a reduced diameter portion 103, and a sloping cam surface portion 105 extending to a larger-diameter end portion 107. A spring bias is provided for the displacement portion 83 by a coil spring 109 disposed about the tubular portion 99 and captured between the bearing-spacer 92 on the bulkhead 29 and the spring retainer ring portion 101, the spring 109 biasing the cam element 97 and the shaft 87 rearwardly, towards the wall 93. The extent of movement in this direction is restricted by the hub spacer portion 89 abutting against the bearing-spacer 92 on the bulkhead 29 and by a fixed collar 110 on shaft 87 abutting against the bearing-spacer 96 on wall 93.

The camming plate 84 is mounted in fuselage 13 at the same elevation as the surface defined by the lower edge of the larger-diameter end portion 107 of cam element 97.

Cooperating with the displacement portion 83 of the switch arrangement 81, the switch portion 85 includes a pair of electrical normally-off single-pole single-throw micro switches 111, 112 (FIG. 6) having depressable switch activating buttons 113, 114, respectively. The switches 111, 112 are mounted by conventional means, such as plastic rivets 115, to a switch plate 117 having a switch lever 119, a pivot plate 121 (FIG. 2) with a bearing hole 123 pivoting about a pivot post 125, and a special toggle arrangement 127. The latter arrangement includes an arm 129, an integral or live hinge 131 at the end of the arm 129, and a generally kidney-shaped opening 133 in an end piece 135, the opening 133 being dimensioned and shaped to just accommodate an airframe-mounted detent pin 137, as will subsequently be described in more detail.

The switch 111 includes contact posts 139A, 139B and 139C to which appropriate electrical wires 140A, 140B and 140C (FIG. 5) connect the switch to a rechargeable radio battery 141, (FIG. 1) a conventional radio frequency interference suppression filter or choke 143 and a motor battery pack 144.

The switch 112 includes contact posts 145A, 145B and 145C (FIG. 5) to which appropriate electrical wires 147A, 147B and 147C connect switch 112 to a battery charging receptacle 148 (FIG. 1), a radio-receiver receptacle 150 and the radio battery 141, respectively. The battery charging receptacle 148 is also connected to (1) the motor battery pack 144 by a lead 148A, (2) the choke 143 by a lead 148B, and (3) the radio battery 141 by a lead 148C. The radio receiver receptacle 150 is also connected to (1) the radio battery 141 by a lead 150A, and (2) a double-acting magnetic coil 201 by leads 150B, 150C and 150D, respectively. When a first portion of coil 201 is energized by a signal received by a radio receiver (not shown) which may be connected to radio receiver receptacle 150, an airplane remote control link 202 is swung in the direction of arrow 204 by magnetic attraction. When a second portion of coil 201 is energized, link 202 is swung in the direction of arrow 206 by magnetic attraction.

With reference now more specifically to FIGS. 2–5, there is illustrated the various relationships of the components of the switch arrangement 81. Thus, FIG. 2 shows that switches 111, 112 (and their activating buttons 113, 114) may be pivoted away from the displacement portion 83 and the camming plate 84 by manual positioning of the switch lever 119 as shown by the solid outline. In this configuration, the button 113 cannot contact the displacement portion 83 and button 114 cannot contact plate 84. Therefore, both the motor 21 and the radio receptacle 150 are not energized because the switches 111, 112 are open. It will be noted from this figure that the displacement portion 83 is positioned to its rearward limit by the urging of spring 109. Since shaft 87 is fixedly attached to hub spacer 89 of drive gear 33, this gear, the propeller shaft 59, and propeller 61 are also in their most rearward position. It will also be noted that the toggle arrangement 127 is in a stable "off" position, with the hinge portion 131 straight, and the detent pin 137 located in a forward lobe of the opening 133. This is the configuration in which the system is set prior to initiation of radio tests and powered flight of the toy.

The solid outline of FIG. 3 and the dashed outline of FIG. 2 illustrate a second configuration wherein the radio receptacle 150 is energized so that a receiver (not shown) which may be connected thereto may be activated for tests of the toy's remote-control link 202 prior to the motor 21 being energized. Here, the activating button 114 of the radio switch 112 (see FIG. 6) is depressed by contact with plate 84 to complete the battery circuit to the radio receptacle 150. The switches are moved to this position by manual movement of the lever 119 in the direction indicated by arrow 155. It will be seen that the motor is still not being energized, the displacement portion 83 still being in its most rearward position. The activating button 113 of the motor switch 111 is located adjacent the reduced diameter portion 103 of the cam element 97 and is not depressed.

In this configuration, FIG. 3 shows that the hinge section 131 of the toggle arrangement 127 is bent because the pin 137 finds resistance in passing by the inwardly-extending curved section 157 which defines the forward and rearward lobes of the opening 133. This action causes the end piece 135 to remain in approximately its original position while the arm 129 moves to the left to cause the hinge 131 to bend. This type of integral hinge has a memory characteristic and is thus biased to return to its straight position. Thus, if the lever 119 is moved in the direction 155 no further than shown by the solid outline of FIG. 3, it will return to the position of FIG. 2 when released. This, of course, would again open the radio circuit. However, if the lever 119 is moved further, the plate 121 pivoting about the post 125, the switch 111 and its deactivating button 113 would be in the position indicated by the dashed outline, and the button 113 would contact and be depressed by the sloping cam surface portion 103 of the cam element 97 to energize the motor 21. This extra movement will also cause the end piece 135 to overcome the resistance of movement caused by the pin 137 in the opening 133, and the end piece will rotate forward so that the pin 137 rests in the rearward lobe of the opening 133.

The hinge section 131 will still be somewhat bent and provide a bias on the plate 121 to rotate counterclockwise until the section 131 is straight and the toggle arrangement 127 is in its second stable condition in which the radio receptacle 150 is always energized. Also, the motor circuit, under these conditions may or may not be complete.

As indicated above, the extreme clockwise rotation of the switch plate 121 by the manual movement of the lever 119 will cause the contacts of the switch 111 to close. If for any reason the motor 21 does not develop a predetermined amount of power for the propeller to generate a minimum amount of forward thrust (because the battery is discharged, for example), the switch plate 121, upon release of the lever 119, will move to the position indicated by the solid outline in FIG. 3. This is due to the action of the toggle arrangement 127 noted previously, and the motor circuit will then again be broken. However, where the motor 21 does develop the necessary power, the rotation of the propeller 61 will cause the propeller and the drive train connected thereto to move forward because of its blades reaction with the air. Where the rotational power transmitted to the propeller 61 is at least of a predetermined sufficient magnitude, the propeller shaft 59, the coupling 57, the drive gear 33, and the shaft 87 with its affixed cam element 97 will be caused to move forward (see arrow 159) against the bias provided by the spring 109. This condition is indicated by the dashed outline of the propeller and the displacement portion 83, seen in FIG. 3.

Under these conditions, the sloping cam surface portion 105 will be located forward of its original position so that the switch button 113 will remain depressed, even when the lever 119 is released and the switch plate 121 moves to the position indicated in FIG. 4, under the influence of the toggle arrangement 127.

Now, both the radio receptacle 150 and the motor 21 are energized.

In order to prevent possible permanent damage to the rechargeable battery 144 caused by its becoming exhausted under load, the amount of bias force produced by the spring 109 is designed so that it will cause the sloping cam surface of the displacement portion 83 to move rearwardly and break the motor circuit when the rotating propeller-produced forward-directed thrust forces are reduced in magnitude below a predetermined level. In this way, the system utilizes the fact that when the motor battery's charge is deleted to a predetermined safe minimum level, the rotational power produced by the motor 21 will be reduced and, in turn, the thrust provided by the propeller 61 will decrease to a point where the spring 109 will force the cam surface 105 to move in a direction 161 and become disengaged from the switch 111. This condition is depicted by the solid outline in FIG. 5.

This action usually occurs while the toy craft is in flight, and it is necessary that only the motor is de-energized and not the radio receptacle 150, so that the flight control surfaces of the toy may still be controlled from the ground. This is assured because the switch plate 121, and the radio stich 112 mounted thereon, are held in the position shown in FIGS. 3 and 4 by the toggle arrangement 127.

Once the flight is terminated, the radio receptacle 150 may be turned off by the operator merely pushing the lever 119 in a rearward direction shown by arrow 163 until the pin 137 is located in the forward lobe portion of the opening 133, as illustrated by the dashed outline in FIG. 5. This is the same configuration shown by the solid outline in FIG. 2, the toggle arrangement being back in its first stable condition.

It should thus be evident from the foregoing that a highly-novel and improved automatic battery cut off system for rechargeable battery-powered, electric motor-driven toy vehicles has been disclosed. Although a presently preferred embodiment of the invention has been described in detail, it should be understood that the invention is subject to modification and other embodiments. For example, the battery cut off system may be employed in ground toys as well as airborne toys, and the toys need not include radio-control apparatus. In the case of toys with driven ground wheels, the power delivered to these wheels may cause the axle to move forward against the bias of a spring, for example, as long as at least a predetermined amount of rotational power is developed by its electric motor. Here, the system senses the axle movement to keep the battery circuit complete until the toy battery is discharged to its predetermined minimum safe level whereby the axle will move rearward under the influence of the spring to open the switch in the battery circuit. It should also be noted that the toggle arrangement described herein is novel and has high utility in toy and other fields requiring a similar function.

It should be further understood that the materials used in fabricating the various components and parts of the invention are not critical and any material generally considered to be suitable for a particular function may be utilized.

What is claimed is:

1. A toy vehicle having therein means including a propulsion arrangement for propelling said vehicle, a rechargeable battery-powered electric motor for powering said propulsion arrangement and means including an automatic battery cut off system for disconnecting the battery from its propulsion arrangement load when it is discharged to a predetermined level, the cut off system comprising:

drive means operatively coupling said vehicle's motor to its propulsion arrangement for transmitting said motor's rotational power to said propulsion arrangement; and switch means including an actuation arrangement operatively mechanically coupled to said drive means for sensing the amount of said rotational power transmitted to said propulsion arrangement, said switch means also being electrically connected between said motor and said battery for maintaining energization of said motor only as long as said rotational power transmitted to said propulsion arrangement remains greater than a predetermined level.

2. The system according to claim 1, wherein said actuation arrangement includes a displacement arrangement and and a cooperating electrical switching arrangement, said displacement arrangement having a movable cam surface the positioning of which is determined by said rotational power transmitted to said propulsion arrangement, and said switching arrangement having an electrical switch, the activating portion of which engages said cam surface only as long as said rotational power remains above said predetermined level.

3. The system according to claim 2, wherein said displacement arrangement also includes bias means for exerting a bias force tending to move said cam surface out of engagement with said activating portion of said electrical switch.

4. The system according to claim 2, wherein said switching arrangement includes a pivotally mounted switch plate upon which said electrical switch is mounted, said switch plate including a manually operable switch lever and toggle means for pivoting said switch plate with two biased stable conditions.

5. The system according to claim 4, wherein said toggle means includes an arm fixed to and extending from said switch plate, said arm terminating at a resilient hinge section having a memory characteristic biasing said hinge section toward an unbent configuration, said means also including an end piece having a kidney-shaped opening adapted to restrictively accept a fixedly position detent pin in one of two lobes therein.

6. The system according to claim 1, wherein said drive means includes a drive gear operatively coupled to said electric motor, said drive gear being fixedly attached along its axis of rotation to a drive shaft operatively coupled to said propulsion arrangement, said drive shaft and said drive gear responding by axial movement to said rotational power transmitted to said propulsion arrangement.

7. The system according to claim 6, wherein said switch means includes an electrical switch with an acutation portion; and wherein said actuation arrangement includes a coupling shaft fixedly attached to and movable with said drive gear along said gear's axis of rotation, said actuation arrangement also including a cam element fixed on said coupling shaft, said cam element having a switch-actuating sloping cam surface engaging said actuation portion of said switch only when said axial movement of said drive gear and shaft is in a predetermined direction in a predetermined amount.

8. The system according to claim 7, wherein said actuation arrangement also includes a spring biasing said cam element in a direction opposite said predetermined direction.

9. The system according to claim 6, wherein said propulsion arrangement includes a propeller that creates a forwardly directed axial thrust force when rotating, and wherein said drive shaft is fixedly attached to said propeller along its axis of rotation.

10. The system according to claim 9, wherein said toy vehicle is a flyable toy airplane having an airframe, and wherein said propeller is rotatably mounted on said airframe to propel said toy airplane through the air.

* * * * *